United States Patent [19]

Lu

[11] Patent Number: 5,711,514
[45] Date of Patent: Jan. 27, 1998

[54] SHOCK ABSORBER FOR A BICYCLE

[75] Inventor: Fu-Chung Lu, Kaohsiung Hsien, Taiwan

[73] Assignee: Kai Fa Industry Co., Ltd., Kaohsiung Hsien, Taiwan

[21] Appl. No.: 567,285

[22] Filed: Dec. 5, 1995

[51] Int. Cl.[6] ............... F16F 9/43; F16F 9/14
[52] U.S. Cl. ............... 267/221; 267/64.15; 267/64.28; 188/322.21; 188/322.15
[58] Field of Search ............... 267/64.15, 64.11, 267/64.28, 221, 217, 195, 177; 188/312, 313, 322.21, 322.22, 322.15; 280/284

[56] References Cited

U.S. PATENT DOCUMENTS

| | | | |
|---|---|---|---|
| 4,503,951 | 3/1985 | Imaizumi | 267/64.15 X |
| 4,616,810 | 10/1986 | Richardson et al. | 267/221 X |
| 4,854,429 | 8/1989 | Casey | 188/322.15 X |
| 5,044,614 | 9/1991 | Rau | 267/221 |
| 5,097,928 | 3/1992 | Enders et al. | 267/64.15 X |
| 5,150,775 | 9/1992 | Charles et al. | 188/322.15 X |
| 5,372,224 | 12/1994 | Samonil et al. | 188/322.15 X |
| 5,400,880 | 3/1995 | Ryan | 267/64.28 X |

FOREIGN PATENT DOCUMENTS

| | | | |
|---|---|---|---|
| 117738 | 5/1991 | Japan | 267/177 |
| 82/00506 | 2/1982 | WIPO | 267/64.15 |

*Primary Examiner*—Peter M. Poon
*Attorney, Agent, or Firm*—Marshall & Melhorn

[57] ABSTRACT

A bicycle shock absorber includes a cylinder body which confines a sealed space therein and a valve member which is disposed movably in the cylinder body and which divides the sealed space of the cylinder body into an air chamber that contains high pressure gas, and a fluid chamber that is filled with hydraulic fluid. The cylinder body is formed with a vent hole to access the air chamber and has a plug for sealing the vent hole after the high pressure gas has been introduced into the air chamber. A piston shaft has a connecting section which extends into the fluid chamber, and a piston is retained on the connecting section of the piston shaft and is formed with a plurality of axially extending fluid holes therethrough. A restoring member is disposed outside the cylinder body and is associated operably with the piston shaft and the cylinder body so as to bias the piston shaft outwardly of the cylinder body.

1 Claim, 4 Drawing Sheets

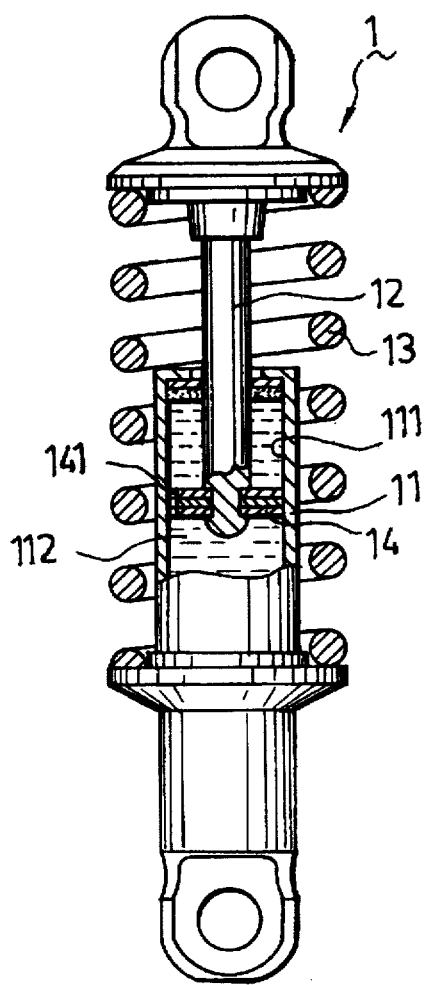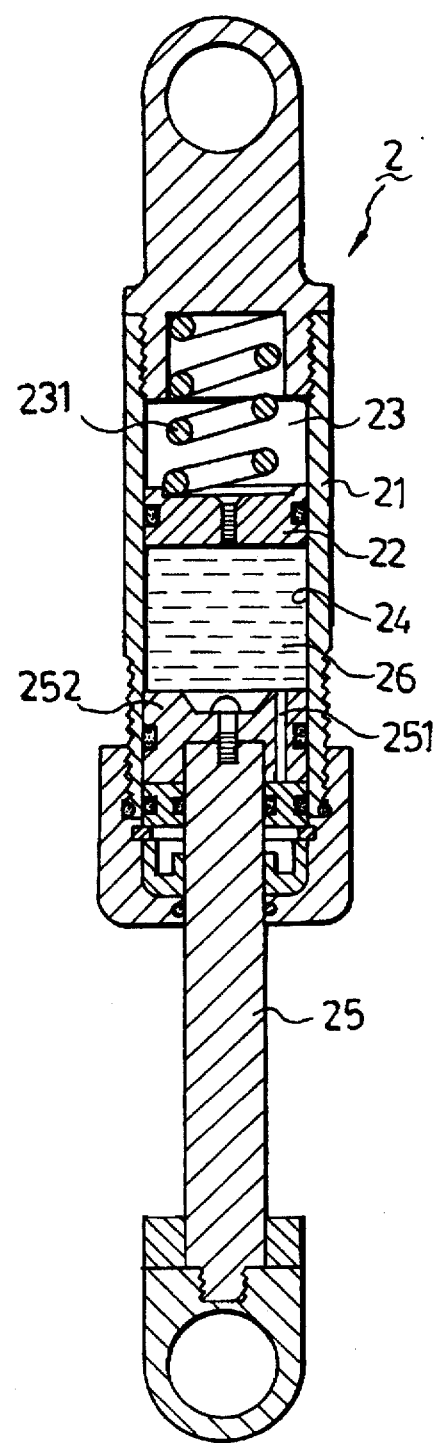
FIG. 1
(PRIOR ART)
FIG. 2
(PRIOR ART)

SHOCK ABSORBER FOR A BICYCLE

BACKGROUND OF THE INVENTION

1. Field of the Invention

The invention relates to a shock absorber, more particularly to a shock absorber for a bicycle.

2. Description of the Related Art

Referring to FIG. 1, a conventional shock absorber 1 for a bicycle is shown to comprise a cylinder body 11, a piston shaft 12 extending into the cylinder body 11, and a spring 13 associated operably with the cylinder body 11 and the piston shaft 12 so as to bias the latter outwardly of the cylinder body 11. The cylinder body 11 defines a fluid chamber 111 which contains an appropriate amount of hydraulic fluid 112 therein. A piston 14 is disposed slidably in the fluid chamber 111 and is mounted on one end of the piston shaft 12. The piston 14 is formed with a fluid hole 141 to permit the flow of hydraulic fluid 112 therethrough when the piston 14 moves in the cylinder body 11. Thus, the hydraulic fluid 112 is capable of providing resistance to movement of the piston 14 to resist, in turn, movement of the piston shaft 12 relative to the cylinder body 11, thereby attaining a shock absorbing effect.

It has been observed that the piston 14 is not movable in the cylinder body 11 when the fluid chamber 111 is filled completely with hydraulic fluid 112. Thus, the fluid chamber 111 usually contains a mixture of hydraulic fluid 112 and gas, such as air, therein. The presence of gas, which is compressible, permits variations in the level of hydraulic fluid 112 in the fluid chamber 111 when the hydraulic fluid 112 is displaced due to extension of the piston shaft 12 in and out of the fluid chamber 111. However, since the gas is mixed with the hydraulic fluid 112, cavitation is likely to occur when the piston shaft 12 is subjected to an external applied force. This situation is aggravated when the piston shaft 12 moves rapidly or moves in and out of the fluid chamber 111 repeatedly. Cavitation produces noise when the shock absorber 1 is in use and affects adversely the resistance provided by the hydraulic fluid 112 to movement of the piston 14.

Moreover, due to the weight of the hydraulic fluid 112 in the fluid chamber 111, the shock absorber 1 can only be used in an upright position, wherein the piston shaft 12 extends downwardly into the fluid chamber 111, thereby limiting the applicability of the shock absorber 1.

Referring to FIG. 2, another conventional shock absorber 2 for a bicycle is shown to comprise a cylinder body 21 and a valve member 22 disposed movably in the cylinder body 21. The valve member 22 divides the cylinder body 21 into a receiving chamber 23 and a fluid chamber 24. A spring 231 is disposed in the receiving chamber 23 and biases the valve member 22 toward the fluid chamber 24. The fluid chamber 24 is filled with hydraulic fluid 26. A piston shaft 25 extends into the fluid chamber 24. A piston 252 is disposed slidably in the fluid chamber 24 and is mounted on one end of the piston shaft 25. The piston 252 is formed with a number of fluid holes 251 to permit the flow of hydraulic fluid 26 therethrough when the piston 252 moves in the fluid chamber 24. In this way, when an external force is applied on the piston shaft 25, the piston 252 presses against the hydraulic fluid 26 and causes the latter to flow through the fluid holes 251. At the same time, the spring 231 is compressed to provide a restoring force for enabling the shock absorber 2 to revert to the normal state. Thus, in the conventional shock absorber 2, the resistance of the hydraulic fluid 26 to movement of the piston 252 in the cylinder body 21 also results in a shock absorbing effect.

Some of the drawbacks of the conventional shock absorber 2 are as follows:

1. Due to material and size limitations, the spring 231 is unable to ensure proper operation of the valve member 22. Note that when an external force is applied on the piston shaft 25 to cause movement of the piston 252 in the fluid chamber 24, the hydraulic fluid 26 in the upper portion of the fluid chamber 24 pushes the valve member 22 to reduce the volume of the receiving chamber 23 instead of flowing through the fluid holes 251 to reach the lower portion of the fluid chamber 24. Thus, neutralization of the external force on the piston shaft 25 cannot be achieved immediately, thereby resulting in a poor shock absorbing effect. In addition, a partial vacuum condition occurs in the fluid chamber 24 when the increase in the volume of the fluid chamber 24 is larger than the increase in the volume of the piston shaft 25 which extends into the fluid chamber 24. Thus, when the piston shaft 25 is pulled, it is possible that the piston 252 will act on the vacuum portion of the fluid chamber 24 and experience a period of no resistance, thereby resulting in a deterioration in the cushioning effect that is provided by the shock absorber 2.

2. The spring 231 is an important component since it provides the necessary restoring force to the valve member 22. However, the spring 231 experiences spring fatigue after the shock absorber 2 has been in use for a period of time, thereby severely affecting the shock absorbing capability of the shock absorber 2.

3. Since the spring 231 is disposed inside the cylinder body 21, the dimensions of the spring 231 are determined by the size of the shock absorber 2. Thus, the assembly and manufacture of the shock absorber 2 is inconvenienced since different springs are required for different sizes of the shock absorber 2.

SUMMARY OF THE INVENTION

Therefore, the object of the present invention is to provide a bicycle shock absorber which can obviate the problem of cavitation and which can provide a more effective shock absorbing effect as compared to the aforementioned prior art.

Accordingly, the bicycle shock absorber of the present invention comprises a cylinder body which confines a sealed space therein and a valve member which is disposed movably in the cylinder body and which divides the sealed space of the cylinder body into an air chamber that contains high pressure gas, and a fluid chamber that is filled with hydraulic fluid. The cylinder body is formed with a vent hole to access the air chamber and has a plug for sealing the vent hole after the high pressure gas has been introduced into the air chamber. A piston shaft has a connecting section which extends into the fluid chamber, and a piston is retained on the connecting section of the piston shaft and is formed with a plurality of axially extending fluid holes therethrough. A restoring member is disposed outside the cylinder body and is associated operably with the piston shaft and the cylinder body so as to bias the piston shaft outwardly of the cylinder body.

BRIEF DESCRIPTION OF THE DRAWINGS

Other features and advantages of the present invention will become apparent in the following detailed description of the preferred embodiment, with reference to the accompanying drawings, of which:

FIG. 1 is a schematic sectional view of a conventional shock absorber for a bicycle;

FIG. 2 is a schematic sectional view of another conventional shock absorber for a bicycle;

DETAILED DESCRIPTION OF THE PREFERRED EMBODIMENT

Figure 3:
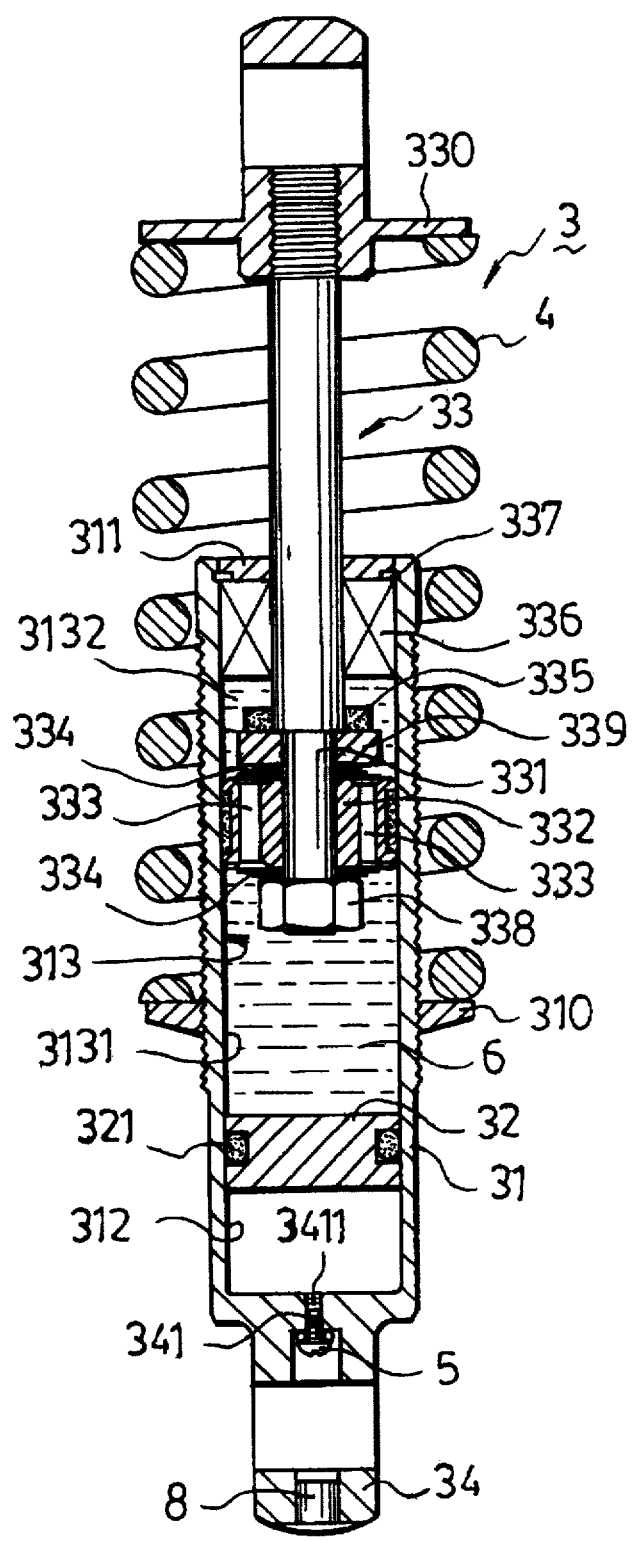
FIG. 3 is a schematic sectional view of the preferred embodiment of a shock absorber for a bicycle in accordance with the present invention.

Referring to FIG. 3, the preferred embodiment of a bicycle shock absorber 3 according to the present invention is shown to comprise a cylinder body 31, a valve member 32 disposed movably in the cylinder body 31, and a piston shaft 33 which extends into the cylinder body 31. An annular spring support 310 extends radially outward from the cylinder body 31 and supports one end of a restoring member 4, such as a spring, thereon. In this embodiment, the cylinder body 31 is threaded externally, and the spring support 310 is mounted threadedly on the cylinder body 31. The cylinder body 31 has one end formed with a connector 34. The cylinder body 31 is further formed with a vent hole 341 which extends through the connector 34. Preferably, the vent hole 341 is formed with an internal screw thread 3411. The vent hole 341 is used to introduce high pressure gas into the cylinder body 31 and is sealed by a plug 5, such as a screw, in order to retain the high pressure gas inside the cylinder body 31. The cylinder body 31 further has an opposite end closed by a cap 311. Thus, the cylinder body 31 confines a sealed space. The pressure of the gas in the cylinder body 31 depends upon the dimensions of the latter. In this embodiment, the high pressure gas has a pressure higher than 6 atm.

The valve member 32 divides the sealed space of the cylinder body 31 into an air chamber 312 and a fluid chamber 313. The high pressure gas is contained in the air chamber 312, while the fluid chamber 313 is filled with hydraulic fluid 6. In order to seal the air chamber 312 from the fluid chamber 313, the valve member 32 is provided therearound with a seal ring 321 which is in sliding and sealing contact with the inner wall surface of the cylinder body 31.

The piston shaft 33 has a distal end portion provided with a radial pressing plate 330 that abuts against an opposite end of the restoring member 4. Thus, the restoring member 4 is capable of biasing the piston shaft 33 outwardly of the cylinder body 31. The other end portion of the piston shaft 33 extends into the fluid chamber 313 of the cylinder body 31 and is formed with a diameter-reduced connecting section 331. A piston 332 is sleeved on the connecting section 331 and is retained thereat by a nut 338 which engages threadedly the connecting section 331. The piston 332, which divides the fluid chamber 313 into first and second sub-chambers 3131, 3132, is formed with a plurality of axially extending fluid holes 333 therethrough. Two stacks of annular regulating plates 334 are sleeved on the connecting section 331 and are disposed respectively on opposite ends of the piston 332 to regulate fluid flow through the fluid holes 333. The opposite ends of the piston 332 protrude slightly to prevent the regulating plates 334 from blocking completely the fluid holes 333. In addition, the diameters of the regulating plates 334 in each stack decrease gradually from the respective end of the piston 332. A guard ring 339, a cushioning ring 335, a guide block 336 and a seal member 337 are also provided on the piston shaft 33 and are located above the piston 332. The guard ring 339 limits the opening movement of the regulating plates 334 to ensure proper operation of the latter.

When introducing the high pressure gas into the air chamber 312 via the vent hole 341, the cylinder body 31 is initially disposed in a sealed compartment. The high pressure gas is then introduced into the sealed compartment and, when the pressure in the air chamber 312 has exceeded the desired pressure, the plug 5 is installed to seal the vent hole 341. The cylinder body 31 is then removed from the sealed compartment. Finally, a cover piece 8 is used to close a portion of the vent hole 341 in the connector 34 to conceal the plug 5 and prevent accidental operation of the latter.

Figure 4:
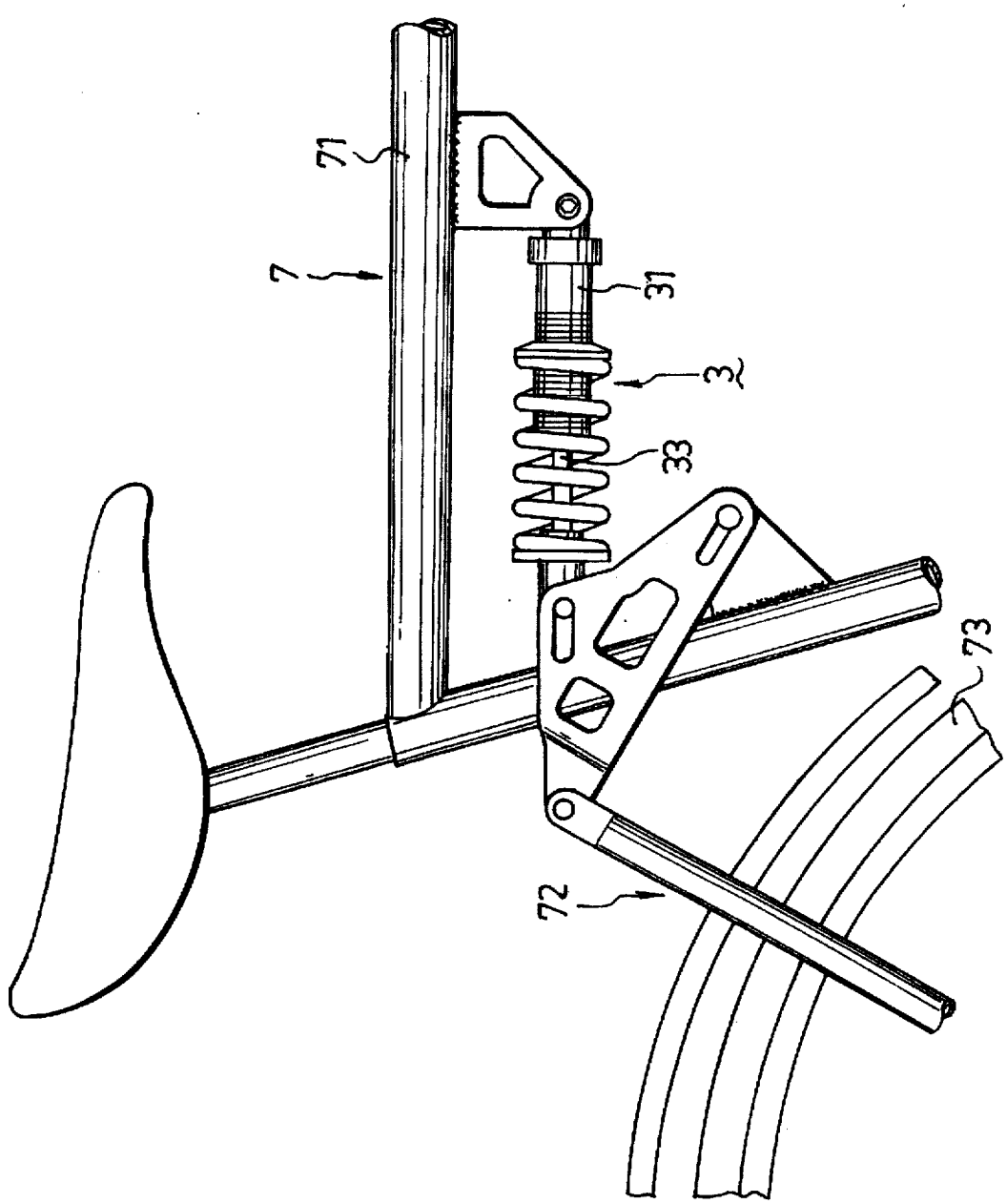
FIG. 4 is a schematic view illustrating the preferred embodiment when installed on a bicycle.

After the shock absorber 3 has been assembled, the valve member 32 divides the sealed space of the cylinder body 31 into the air chamber 312 which contains the high pressure gas, and the fluid chamber 313 which contains the hydraulic fluid 6 and which has the piston shaft 33 extending therein. Referring to FIG. 4, when the shock absorber 3 is installed on a bicycle 7, the cylinder body 31 is mounted pivotally on the bicycle frame 71 while the distal end portion of the piston shaft 33 is mounted pivotally to a wheel suspension mechanism 72 of the bicycle 7. Thus, when the bicycle 7 is passing through a rough road surface, the rear bicycle wheel 73 can transmit a force to the piston shaft 33 via the suspension mechanism 72.

Figure 5:
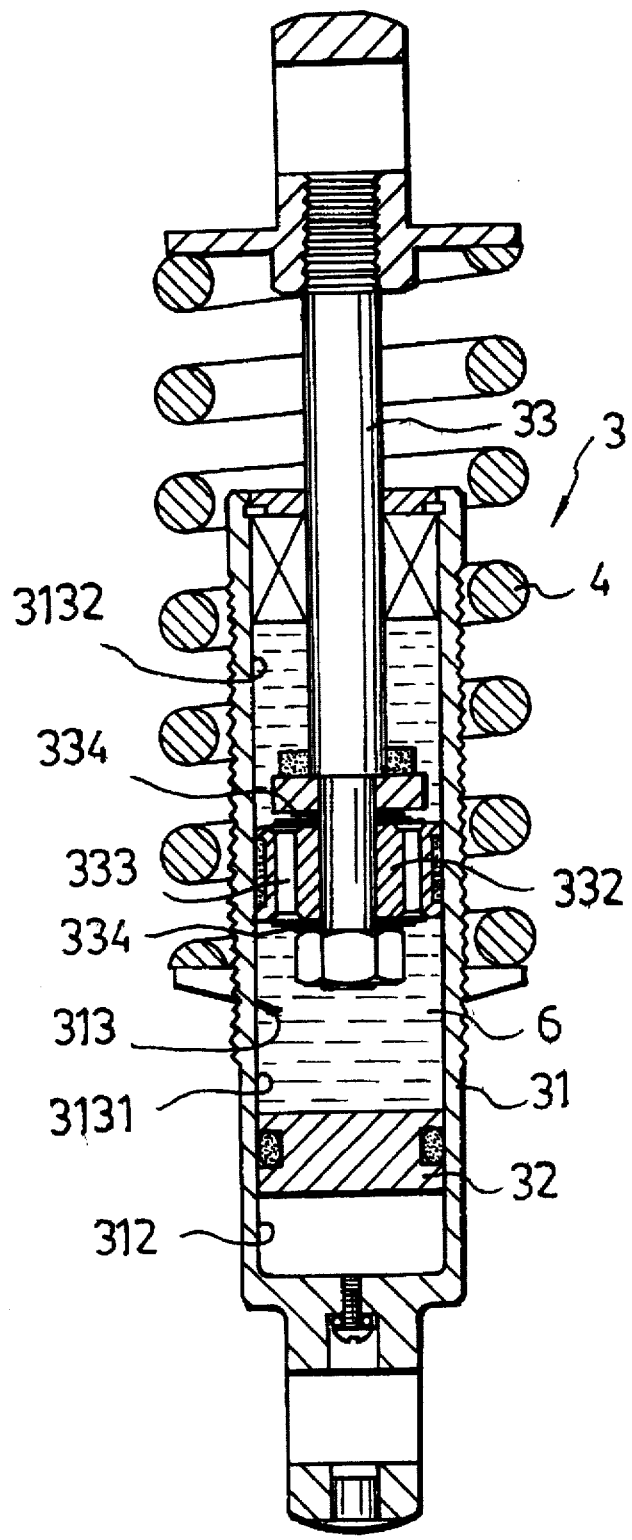
FIG. 5 is a schematic sectional view illustrating the operation of the preferred embodiment.

FIG. 5 illustrates the piston shaft 33 when retracted into the cylinder body 31. As shown, the restoring member 4 is compressed, and the piston 332 is moved further into the fluid chamber 313 to press the hydraulic fluid 6 in the first sub-chamber 3131 toward the valve member 32, thereby reducing the volume of the air chamber 312 by an amount equal to the increase in the volume of the piston shaft 33 which extends into the cylinder body 31. The fluid chamber 313 remains filled with the hydraulic fluid 6, i.e. no vacuum condition occurs in the fluid chamber 313. Thus, the high pressure gas in the air chamber 312 can effectively support the hydraulic fluid 6 in order to ensure that the hydraulic fluid 6 in the first sub-chamber 3131 can flow through the fluid holes 333 in the piston 332 in order to reach the second sub-chamber 3132. The regulating plates 334 control the rate of flow of the hydraulic fluid 6 through the fluid holes 333 to cushion the force applied on the piston shaft 33, thereby resulting in an effective shock absorbing effect. Thus, when the shock absorber 3 is in use, vibration of the bicycle frame 71 can be minimized while the wheel 73 of the bicycle 7 passes along a rough road surface to avoid upsetting the balance of the rider. In addition, since the valve member 32 divides the cylinder body 31 into the air chamber 312 and the fluid chamber 313 which is sealed from the air chamber 312, and since the air chamber 312 contains the high pressure gas therein, the total length of the cylinder body 31 can be reduced. Thus, the shock absorber 3 can be sized so as to complement that of the bicycle 7.

When the force applied on the piston shaft 33 is relieved, the high pressure gas in the air chamber 312 and the restoring member 4 expand to move the piston shaft 33 outwardly from the cylinder body 31, as shown in FIG. 3. Since the piston shaft 33 is pulled outwardly, no vacuum condition occurs in the second sub-chamber 3132. At the same time, the hydraulic fluid 6 in the second sub-chamber 3132 flows through the fluid holes 333 in the piston 332 to reach the first sub-chamber 3131. The regulating plates 334 still regulate the flow of hydraulic fluid 6 at this time to provide some resistance to pulling action on the piston shaft 33. Thus, since the hydraulic fluid 6 can provide resistance to movement of the piston shaft 33 in both directions, the shock absorber 3 is capable of effectively absorbing successive shock which would have otherwise affected operation of the bicycle 7.

The advantages and characterizing features of the shock absorber 3 of the present invention are as follows:

1. In the shock absorber 3, the sealed space confined by the cylinder body 31 is divided into the fluid chamber 313 and the air chamber 312, which is sealed from the fluid chamber 313 and which contains the high pressure gas therein, to ensure proper movement of the piston 332 in the cylinder body 31 and to avoid the occurrence of cavitation. In addition, the regulating plates 334 ensure that no vacuum condition will occur in the fluid chamber 313 so that the shock absorber 3 is capable of effectively absorbing successive shock.

2. Since the shock absorber 3 does not include a spring inside the cylinder body 31, the length of the shock absorber 3 can be minimized and the problem of spring fatigue can be avoided, thus prolonging the useful life of the shock absorber 3.

3. Since cushioning of both pushing and pulling forces on the piston shaft 33 is possible, the shock absorber 3 of the present invention can be mounted in different positions on a bicycle without affecting operation of the shock absorber 3.

4. The cover piece 8 conceals the plug 5 which seals the vent hole 341 to prevent accidental operation of the latter.

5. The shock absorber 3 can be made to correspond in size with the bicycle 7 without any limitations being encountered due to the absence of the spring in the cylinder body 31, thereby easing assembly and manufacture of the shock absorber 3 and facilitating installation of the shock absorber 3 on the bicycle 7.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle shock absorber, comprising:

a cylinder body having first and second ends and confining a sealed space therein, said second end of said cylinder body being provided with a connector that has an axis transverse to a longitudinal axis of said cylinder body, said second end of said cylinder body being formed with a vent hole that extends through said connector and has an axis parallel to the longitudinal axis of said cylinder body, said second end of said cylinder body having a plug for sealing said vent hole;

a valve member disposed movably in said cylinder body, said valve member dividing said sealed space of said cylinder body into an air chamber which contains high pressure gas and which is adjacent to said second end of said cylinder body, and a fluid chamber which is filled with hydraulic fluid and which is adjacent to said first end of said cylinder body, said vent hole permitting access to said air chamber, said plug being used to seal said vent hole after the high pressure gas has been introduced into said air chamber;

a piston shaft having a connecting section which extends into said fluid chamber of said cylinder body;

a piston retained on said connecting section of said piston shaft and formed with a plurality of axially extending fluid holes therethrough; and a restoring member disposed outside said cylinder body and associated operably with said piston shaft and said cylinder body so as to bias said piston shaft outwardly of said cylinder body.

* * * * *